United States Patent [19]

Scroggins

[11] Patent Number: 5,624,562
[45] Date of Patent: Apr. 29, 1997

[54] APPARATUS AND TREATMENT FOR WASTEWATER

[75] Inventor: Dan Scroggins, Crescent Springs, Ky.

[73] Assignee: EV Environmental, Inc., Westport, Conn.

[21] Appl. No.: 407,115

[22] Filed: Mar. 20, 1995

[51] Int. Cl.$^6$ .................................................. C02F 3/30
[52] U.S. Cl. .................... 210/605; 210/614; 210/630; 210/143; 210/195.3; 210/220; 210/903
[58] Field of Search .................... 210/605, 614, 210/623, 626, 630, 143, 195.1, 195.3, 202, 219, 220, 903

[56] References Cited

U.S. PATENT DOCUMENTS

| | | | |
|---|---|---|---|
| 2,788,127 | 4/1957 | Davidson | 210/903 |
| 2,875,151 | 2/1959 | Davidson | 210/903 |
| 4,655,925 | 4/1987 | Tabata et al. | 210/605 |
| 4,663,044 | 5/1987 | Goronszy | 210/903 |
| 4,818,408 | 4/1989 | Hamamoto | 210/614 |
| 4,894,162 | 1/1990 | Cournoyer et al. | 210/631 |
| 4,917,805 | 4/1990 | Reid | 210/605 |
| 5,013,441 | 5/1991 | Goronszy | 210/605 |
| 5,019,266 | 5/1991 | Soeder et al. | 210/614 |
| 5,137,636 | 8/1992 | Bundgaard | 210/605 |
| 5,234,595 | 8/1993 | Di Gregorio et al. | 210/605 |
| 5,252,214 | 10/1993 | Lorenz et al. | 210/903 |
| 5,266,200 | 11/1993 | Reid | 210/605 |

FOREIGN PATENT DOCUMENTS

| | | |
|---|---|---|
| 57-130593 | 8/1982 | Japan. |
| 58-199098 | 11/1983 | Japan. |
| 1130790 | 5/1989 | Japan. |
| 4358598 | 12/1992 | Japan. |

OTHER PUBLICATIONS

Abstract of USSR 889631 Dec. 1981.
Translation of Japan 57–130593.

*Primary Examiner*—Christopher Upton
*Attorney, Agent, or Firm*—Yahwak & Associates

[57] ABSTRACT

The present invention relates to the pretreatment and treatment of biodegradable wastewater utilizing a series of treatment modes within a single variable depth reactor apparatus to biologically reduce the biochemical oxygen and chemical oxygen demand in domestic and industrial wastewater.

19 Claims, 6 Drawing Sheets

APPARATUS AND TREATMENT FOR WASTEWATER

The biological treatment of wastewater is conventionally conducted by an initial preliminary treatment of the waste stream, followed by three subsequent treatments to more fully purify the waste stream prior to its release into the environment.

The preliminary treatment of wastewater is usually limited to removal of gross solids and flow equalization. Gross solids are usually removed from the waste stream by various types of screening processes, or alternatively by macerating or communiution devices which reduce the solids to a relatively negligible size in order to minimize downstream operational problems during subsequent wastewater treatment. Flow equalization is accomplished by the inclusion of tankage, of a sufficient volume, to absorb the daily flow variations originating from the wastewater source.

Following preliminary treatment, wastewater normally undergoes a primary treatment step consisting of a more process intensive treatment whereby additional liquid solid separation takes place. This treatment is generally accomplished by use of devices such as a gravity settling tank or clarifier, or a dissolved air flotation system. In both cases, the device used accounts for the removal of a substantial portion of the suspended solids, and the bulk of the settleable solids, present in the waste stream. The effects of this form of liquid/solid separation may be augmented by the addition of chemicals that cause the agglomeration of finely divided solids to facilitate settling or flotation. Furthermore, these chemicals may be added to this treatment to enhance the removal of emulsified oils or chemically sequestered compounds. Lastly, chemicals may be added to cause the precipitation of dissolved contaminants, e.g., heavy metals.

Following primary treatment, the waste stream next undergoes a secondary treatment that consists of the reduction of complex organic materials, via biological respiration, into simple physical forms, primarily biological cell mass, carbon dioxide and water. This biological reduction process is usually accomplished by one of two modes, specifically wherein the biomass is grown on fixed films within the waste stream, or wherein it is grown as a suspended growth throughout the liquid undergoing treatment. In the fixed film mode, a biological culture (commonly referred to as a "slime") is developed on an inert media, and the organic material in the waste stream is adsorbed and absorbed by this slime. As the biological slime continues to develop, the surplus biomass is constantly sloughed off and removed from the flow stream in a secondary clarifier. In the suspended growth mode, a floc forming biomass is developed in a mixed liquor. This biological floc absorbs the soluble organic material in the waste stream and converts it in a fashion similar to the manner in which the fixed film biological organisms accomplish the same function. The mixed liquor is constantly transferred to secondary clarifiers where liquid/solid separation takes place. The settled biological floc is then returned to the aeration basin as an activated sludge for reintroduction to the incoming wastewater flow. As surplus biomass is grown, it is periodically removed from the system as waste activated sludge (WAS) in order to maintain the proper mixed liquor suspended solids (MLSS) concentration required for a particular treatment objective. The majority of the suspended growth treatment systems operate on some variation of this conventional activated sludge process.

Following the secondary treatment step, the waste stream next enters a tertiary treatment which normally provides the final polishing step where the suspended solids that escaped the clarifies are captured by a physical barrier such as a filter.

While this provides a general outline of the conventional biological treatment of wastewaters, several modifications have been developed in an attempt to improve upon the efficiency of such treatments.

The use of oxic/anoxic cycles for wastewater treatment is well-known in the industry and has been well-documented in U.S. Pat. Nos. 2,788,127 and 2,875,151. However, the treatments described in these patents utilized different cycles in subsequent reactors or multiple stages. Thus, the apparatus to provide such a cyclic treatment is relatively large, expensive, and insufficient when compared to subsequent advances.

In 1987 and 1991 two patents issued, U.S. Pat. Nos. 4,663,044 and 5,013,441 which put forth the idea of conducting multiple oxic and anoxic cycles in a single biological reactor, but proposed to operate parallel reactors on a batch basis. These patents described a sequencing batch reactor (SBR) system which attempted to accomplish treatment in a batch plug flow process —the present invention, on the other hand, describes a continuous complete mix system for the treatment of wastewater. The cited two patents also point out that industrial wastewater with biochemical oxygen demands (BOD's) in excess of 3,000 mg/l are not economically amenable to bio-degradation by the aerobic process and therefore concentrates proof of treatment on the treatment of 300 mg/l domestic wastewater. In U.S. Pat. No. 5,013,441, the inventor further concentrates on the removal of nitrogen and phosphorus in domestic wastewater in order to attain a high-quality effluent for discharge into a receiving stream. In order to accomplish this, three successive stages are described in the patent to accomplish nitrogen and phosphorus removal, and these stages operate in both aerated and non-aerated cycles.

The approach described in U.S. Pat. No. 5,013,441 varies from the multiple stage continuous oxic/anoxic systems described in U.S. Pat. Nos. 2,788,127 and 2,875,151 in that a single stage reactor is used in a batch mode, and sludge is not recycled to the aeration tanks. However, the SBR system accomplishes sludge recirculation with the use of a non-aerated selector tank designed to allow the active biomass (an unthickened sludge) to be introduced to the incoming wastewater in a non aerated reactor.

In the SBR design as detailed in U.S. Pat. Nos. 4,663,044 and 5,013,441, there are a number of operational problems that occur when the system is placed in use. These problems revolve around the SBR's inability to control aeration as a function of biological respiration—the present invention addresses this problem. In addition, the SBR aeration system is controlled by a programmable logic controller (PLC), with the initiation and termination of the aeration blowers controlled by an internal timer preset by the equipment manufacturer. This approach allows for operational variability, but based upon observations made by the operator, not based upon the more reliable and consistent biological respiration occurring within the biomass—the present invention addresses this problem.

Still another short-coming noted by those utilizing SBR systems is the hydraulic management associated with batch operations. In the SBR approach outlined in U.S. Pat. Nos. 2,788,127 and 2,875,151, slug discharges often need to be equalized prior to some down-stream tertiary treatment equipment, and the influent flow must also be managed and stored between parallel batch reactors. This method is especially difficult due to the need to introduce flow only during specific sequences in the SBR and not during others.

Therefore, a SBR-based wastewater treatment process may often require equalization both prior to the treatment within the reactors as well as subsequent to such treatment. Finally, SBR-based apparatus is plagued with solids carryover in the effluent due to a myriad of factors, but primarily due to flooded decant tubes, excessive weir overflow rates, or the close proximity of the sludge blanket surface to the weir overflow level.

U.S. Pat. No. 4,655,925, attempts to address one of the control points by describing the use of a dissolved oxygen (D.O.) meter to measure the D.O. level in the mixed liquor. This approach is flawed in that it measures the D.O. level in the reactor basin and controls the blowers supplying oxygen to the basin by altering their speed or running time in order to maintain the D.O. at a predetermined level for a predetermined period of time. This design simply insures that the water is oxygenated to a particular level; the control is in no way linked to the oxygen uptake of the biomass—a linkage which is the present invention addresses. In order to maintain a D.O. of 2.0 mg/l, the aeration tank of the SBR is aerated for some predetermined rate at a predetermined organic loading. Since the organic loading is based on the oxygen demand created by a particular predetermined mass of BOD, the target D.O. is a function of a static organic load. This load is determined based upon a test procedure requiring five days to complete; this yields an operational control loop with at least a five day lag between real at site oxygen demand and oxygen delivered for treatment. The attainment of a D.O. of 2.0 mg/l appears to simply be an endorsement of the air delivery system's ability to oxygenate the wastewater; the design has no immediate way to assess the oxygen uptake of the biomass or to continuously adjust the air delivery system in order to accommodate it.

U.S. Pat. No. 5,266,200 describes an attempt to overcome the above-listed problems with SBR and other activated sludge systems. First it addresses the hydraulic management issue with the use of a separate flow equalization tank that balances the flow to the downstream systems at a constant gallon per minute (gpm) flow rate, providing a means for consistently loading wastewater on a continuous basis to a single stage bioreactor. This approach overcomes the hydraulic sequencing problems experienced with most SBRs. The continuous overflow from the bio-reactors to the clarifiers is a cumulation of the average daily flow plus the return activated sludge (RAS) flow. The clarifiers therefore accomplish liquid/solid separation in a conventional mode, with the RAS being returned to the bioreactor, thus precluding the suspended solids washout normally experienced with SBR. In addition, the technology described in this patent attempts to overcome the sequence control problem with the use of D.O. meters and predetermined set points to initiate anoxic and oxic cycles. However, it still utilizes preset timers to terminate each individual cycle. Since this technology uses D.O. meter set points to determine the beginning of the anoxic and oxic cycles, it overcomes some of the problems associated with the SBR's D.O. control loop. However, there are still a number of problems with this device. For example, the D.O. meter only initiates the aeration blowers for a preset period of time only after the D.O. reaches a predetermined low point in the anoxic mode; the termination point is determined by passage of time, not biomass respiration. Secondly, the D.O. is measured during the anoxic mode at mid-depth in the reactor as opposed to measuring it in the settled sludge blanket where the bulk of the biomass respiration is occurring. Lastly, the attainment of the upper D.O. point simply triggers a timer to allow the aeration blowers to operate for an additional period of time;

an approach which allegedly offers electric power savings, especially when coupled with variable speed blowers, but no mention is made of how this is accomplished, nor is any mention made of what happens if, due to excessive biomass respiration, the preset D.O. level is not attained. In the present invention this issue is addressed, as will be more fully described below, by providing a D.O. monitoring and control system that controls blower operation and does not simply start blower run timers; a better overall operational efficiency is attained with the D.O. control loop blowers being started once the D.O. has been completely eroded, and the blower operation being terminated once a specific D.O. level has been achieved. This approach allows the oxic/anoxic cycles to be maintained while shortening them; it also optimizes blower utilization as it precludes over-aeration and its associated problems with power consumption and the formation of a non-settling biomass.

As is readily apparent, there is still a need to provide for an apparatus and treatment process that will not have the problems associated with the technology described in the above-listed U.S. Patents.

Accordingly, it is the primary object of the present invention to describe a continuous treatment for wastewater from domestic and industrial sources that provides for the removal of organic contaminants.

It is an additional object of the present invention to describe an apparatus for use with the continuous treatment for wastewater from domestic and industrial sources that will continuously equalize entering wastewater and buffer the internal hydraulics of a wastewater treatment system.

It is still an additional object of the present invention to provide a means for controlling the oxygen supply to an apparatus used for a continuous treatment for wastewater from domestic and industrial sources which comprises the measurement of biomass respiration within the biomass sludge blanket of the apparatus.

The following description, examples and accompanying figures depicting the apparatus and treatment process of the present invention are presented in order to provide a more complete understanding and illustration of the present invention. These are merely illustrative of the present invention and should not be deemed to limit the scope of the present invention in any manner.

Figure 1:
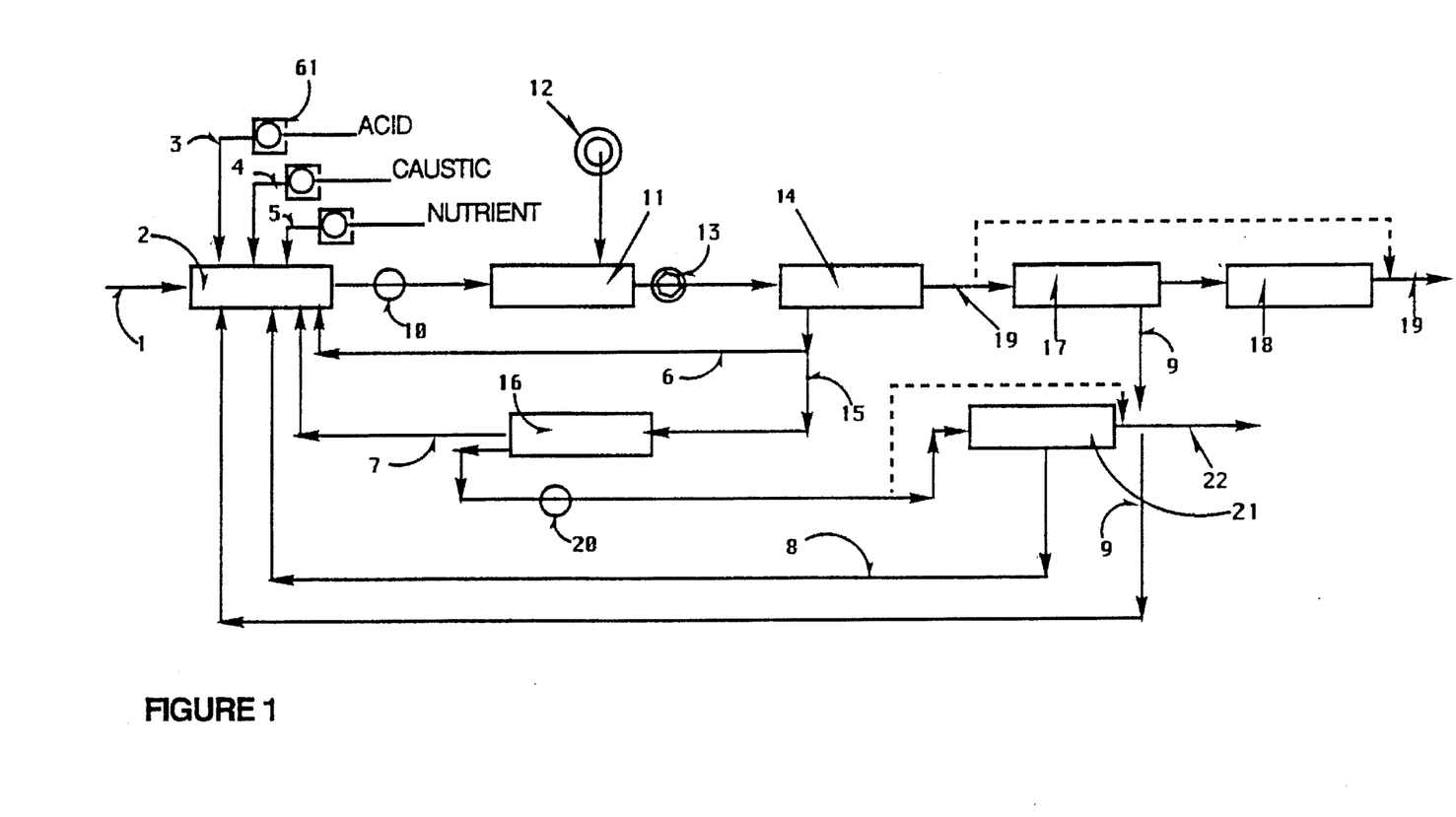
FIG. 1 is a general representation depicting the process flow of a continuous wastewater treatment process according to the present invention.

Referring to FIG. 1, there is shown a depiction of the process flow that occurs in a system comprised of a single apparatus according to the present and various supporting devices. More particularly, FIG. 1 depicts an influent line 1 that carries effluent from the wastewater source to an activator 2 wherein the pH of the wastewater is adjusted to a pH of from 7.0 to 8.0, preferably 7.5 to 8.5, by the introduction of acid through an acid feed line 3 and caustic through a caustic feed line 4. The nutrient balance in the activator is also maintained by an external source of nutrient that may be found to be deficient or lacking in the wastewater being treated, as is often the case with industrial wastewaters. Although this is an optimal which is seldom obtained in actual practice, the nutrient balance between carbon, nitrogen and phosphorus sources should be 100:5:2 in order to provide for the development of a healthy and efficient biomass. Nutrient is introduced to the activator by a nutrient feed line 5. In each instance, the flow through the acid, caustic and nutrient feed lines is controlled by an appropriate metering pump 61 in the line. The activator 2 mixes the wastewater flowing into the activator through line 1 with the active biomass being returned from the bottom of the secondary clarifier through return activated sludge (RAS) loop 6.

The mixed, conditioned and biologically activated wastewater is then pumped by activator transfer pump 10 into the variable depth reactor 11 according to the present invention. Within the variable depth reactor, the organic material present in the wastewater is biologically broken down and converted into carbon dioxide, water and cell mass. This is accomplished by both oxic and anoxic organisms. Oxygen to satisfy the respiratory requirements of the oxic organisms is supplied by an external blower 12 compressing atmospheric air and diffusing the compressed air into the bottom of the reactor. Oxygen requirements of the anoxic organisms are supplied by the assimilation of chemically bound oxygen present in the by-products from oxic biological reduction. The variable depth reactor 11 fosters the development of an active biomass by keeping it mixed with the incoming conditioned and activated wastewater while supplying its direct and indirect oxygen requirements. This biomass naturally agglomerates to form a readily setteable floc in the mixed liquor within the reactor.

Mixed liquor from the variable depth reactor 11 is pumped from the reactor by, for example, a variable capacity air lift pump 13 to a clarifier 14. The pump 13 transfers the mixed liquor to the clarifier at a rate set by the operator proportionate to the total daily flow into the system equally divided into 1440 minutes. In other words, it is desired for flow to exit the reactor at a preferable rate equal to the average daily flow (ADF) equalized over a 24 hour period added to a specific RAS rate. In actual use, this rate would be determined by taking the total daily flow and dividing it by 1440 to determine the average gpm to undergo treatment. This gpm flow rate figure is then added to the operator selected RAS rate in gpm. It is preferred that pump 13 be a variable volume air lift pump in order to allow the operator to vary the RAS reactor transfer rate depending upon selected process requirements.

In the clarifier 14, the mixed liquor is given a quiescent environment to allow for the gravity separation of the biological floc from free water. Clarifier 14 is designed so that the settled biological floc is collected and returned to the activator 2 via the RAS return line 6. The relatively clear free water effluent liberated by the liquid/solid separation process taking place in clarifier 14 is discharged through line 19 (dotted in FIG. 1) by displacement directly to a receiving stream, sanitary sewer or downstream systems designed to provide additional treatment if stricter effluent contaminant limits are required.

If strict effluent discharge requirements dictate the effluent from clarifier 14 must undergo some additional polishing step, this may usually be accomplished by passing the effluent in line 19 through a filter 17. This filter is simply another form of a liquid/solid separation device using a semi-permeable physical barrier to retain finely divided solids that may be present in the effluent stream. Periodically, the retention of these finely divided solids occlude the surface area of the filter and necessitate its cleaning or backwashing. In order to accomplish backwashing, previously filtered water is pumped back through the filter loosening the deposited solids and carrying them off in the backwash stream. This backwash steam will contain organic solids that must undergo additional treatment, consequently it is preferred that this backwash stream be conveyed by way of backwash line 9 to activator 2 for additional treatment.

Filtrate exiting filter 17 may require disinfecting in order to kill pathogenic organism that may be present in the wastewater. Disinfecting is usually accompanied with the addition of any of a number of chemical agents, e.g., chlorine, ozone, bromine, etc. in disinfecting unit 18. Disinfecting could also be accomplished by exposing the wastewater to U-V light in the appropriate dosage for a specific amount of time. This would also take place in the disinfecting unit 18. Subsequent to disinfecting, the treated wastewater would be discharged as effluent 19.

Surplus biomass generated by the conversion of organic material into cell mass is wasted from the system as a method of maintaining the appropriate MLSS concentration in variable depth reactor 11 in order to maintain the desired food to microorganism ratio. This is accomplished by removing a specific amount of the RAS from the clarifier as waste activated sludge (WAS) via the WAS loop line 15 into a sludge holding tank 16. WAS delivered to the holding tank 16 begins to undergo endogenous respiration as no new nutrient is added to the tank, and the WAS begins to draw upon its own cell mass as a source of nutrient, and as it does, it begins to starve. This digestion process causes the WAS to liberate water and carbon dioxide; the water liberated is periodically decanted by the operator back to activator 2 by way of line 7.

Settled and digested sludge may be periodically pumped from tank 16 for direct disposal through line 22 (dotted in FIG. 1) or an optional dewatering system 21, by digested sludge pump 20. The dewatering system, if used, would further concentrate the digested sludge from about the 2% coming out of tank 16 to 20–30%, thereby reducing its volume and making it more amenable to ultimate disposal. This dewatering process, if used, would liberate water laden with soluble organic material remaining from the sludge digestion process, and it would be advisable to have this filtrate recycled back to activator 2 by filtrate loop line 8 for additional treatment.

Figure 2:
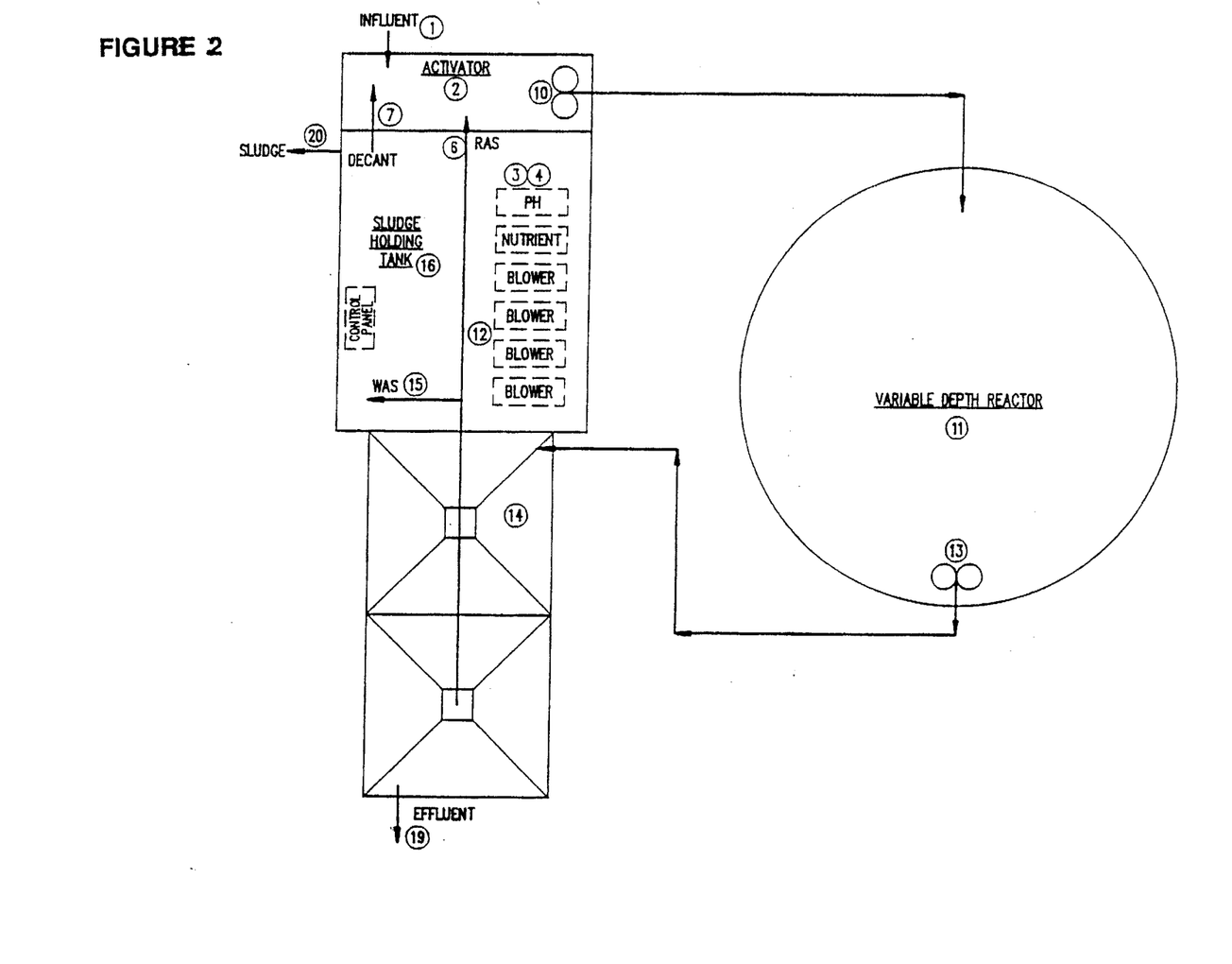
FIG. 2 is a general representation depicting the process flow of a continuous single-stage wastewater treatment process according to the present invention.

With regard to FIG. 2, there is shown a plan view of a single stage single path pretreatment variable depth reactor system placement according to the present invention that has been designed to treat approximately 38,000 gallons per day of 2,000 mg/l BOD food processing wastewater. More specifically, FIG. 2 shows the influent line 1 carrying wastewater to be treated being discharged into activator 2 where it is mixes with RAS and decant 7 prior to being pumped by pump 10 to the variable depth reactor 11. FIG. 2 also shows the placement of the pH control lines 3 and 4, and the nutrient feed system 5 mounted over the holding tank 16 but discharging to the activator 2. For design considerations, the external blower(s) 12 may also be mounted over the holding tank. FIG. 2 also shows the location of the variable depth reactor 11 and its transfer pump 13 conveying the mixed liquor to a hopper bottom-type clarifier 14 from which it is then discharged into a sanitary sewer through line 19 or to subsequent polishing stations as depicted in FIG. 1.

Figure 3:
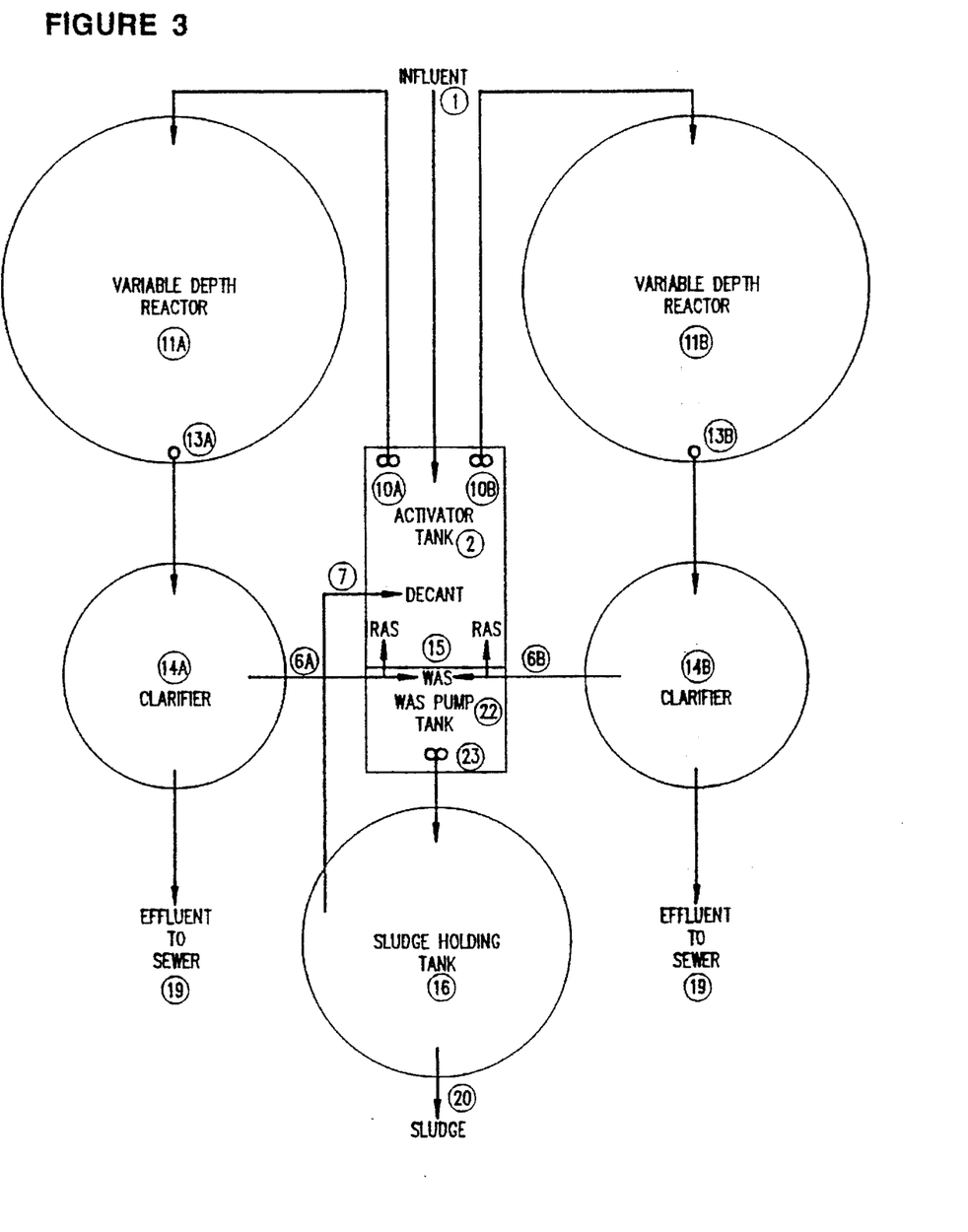
FIG. 3 is a general representation depicting the process flow of a dual train operation of a wastewater treatment process according to the present invention.

With regard to FIG. 3, there is shown a plan view of the placement of units for a single dual path (parallel) variable depth reactor system according to the present invention designed to treat 700,000 gallons per day of food processing wastewater. More specifically, FIG. 3 shows the influent wastewater line 1 entering the activator 2 from where it is pumped by activator transfer pumps 10A and 10B to variable depth reactors 11A and 11B. This treatment with screen 31 is optional, however, in most instances of actual use such filtration would be advantageous. It is preferred that pumps 10A and 10B be equally sized and controlled so that the effluent from one pump approximately equals the effluent from the other. Variable depth reactor transfer pumps 13A and 13B would each pump at the same constant rate to clarifiers 14A and 14B. Effluent from the two clarifiers 14A and 14B is then discharged into a sanitary sewer by effluent line 19. RAS flows by way of the RAS return loops (6A and 6B) to the common activator 2. WAS is removed from the RAS return loops (6A and 6B) to a common WAS pump tank 22, and then pumped by way of WAS transfer pump 23 to sludge holding tank 16. Decant is transferred back to the activator 2 by way of decant return line 7, and digested sludge is pumped through line 20 to a dewatering system 21 (not depicted in FIG. 3) prior to its disposal.

Figure 4:
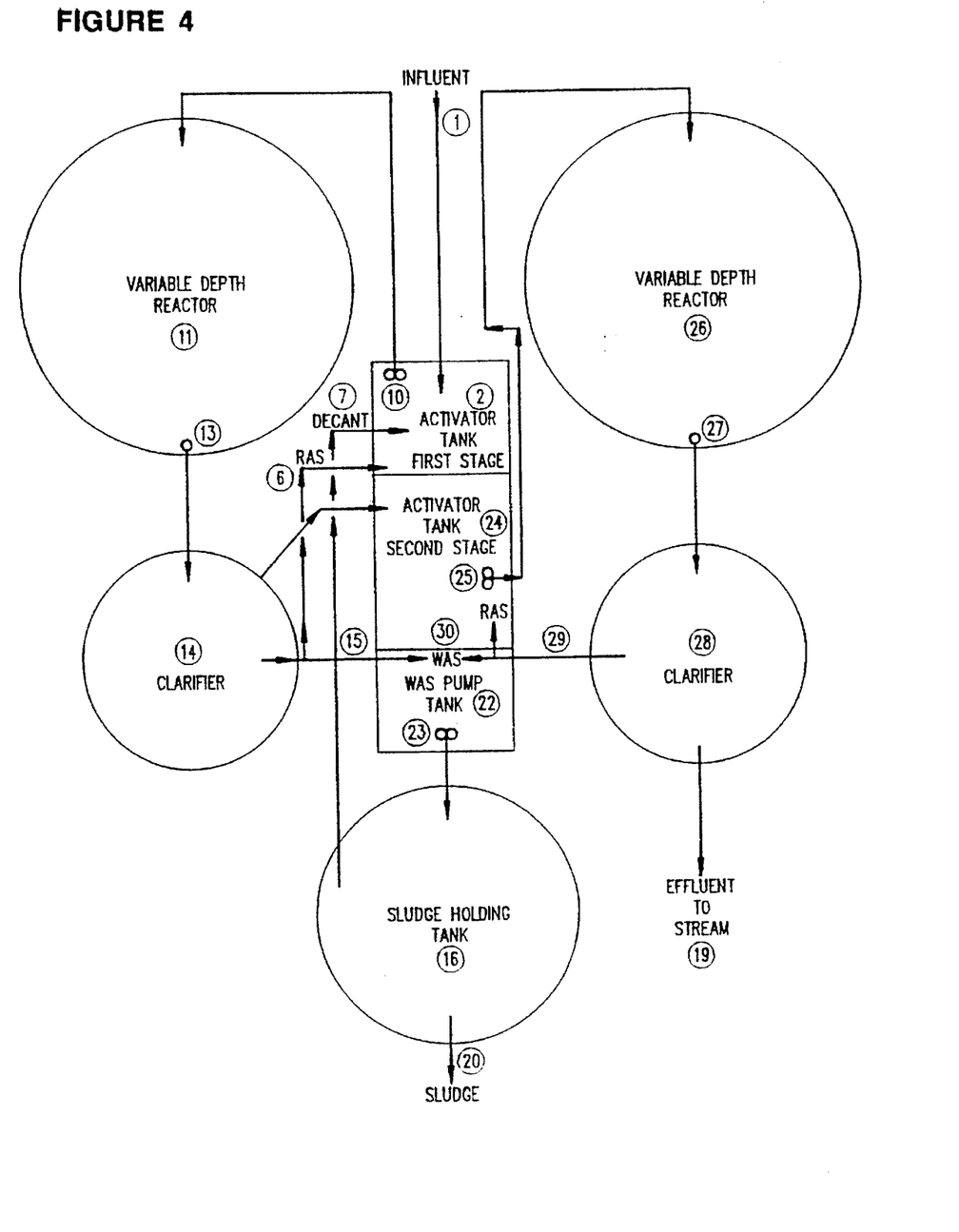
FIG. 4 is a general representation depicting the process flow of a two stage operation of a wastewater treatment process according to the present invention.

With regard to FIG. 4, there is shown a plan view of the placement of units for a two stage (sequential) single path secondary treatment variable depth reactor system according to the present invention designed to treat 700,000 gallons per day of food processing wastewater down to accepted 30/30 mg/l BOD/TSS stream discharge standards. More particularly, FIG. 3 shows an influent line 1 discharging influent into a first stage of two-stage activator 2 where it is mixed with the RAS from a first stage a clarifier 14. The conditioned wastewater is then pumped from the first stage of activator 2 to the first stage variable depth reactor 11 by first stage activator pumps 10. In the first stage of reactor 11, 90%-plus of the soluble organic material will be biologically reduced to simpler forms and converted to carbon dioxide, water and cell mass. The mixed liquor accomplishing this task is pumped at a constant rate from the first stage reactor 11 to the first stage clarifier 14 by way of the first stage reactor air lift pumps 13.

Effluent from the first stage clarifier 14 is then discharged by displacement into the second stage activator 24 for additional treatment. In addition, RAS is returned to the first stage activator 2 by way of the RAS return loop lines 6, and surplus biomass is removed from the RAS loop lines by way of the first stage WAS conveyance line 15 to the WAS pump tank 22 from where it is pumped to a common sludge holding tank 16 by way of a WAS transfer pump 23.

Effluent from the first stage clarifier 14 is mixed with RAS from the second stage clarifier 28 in the second stage activator 24 and pumped by way of the second stage activator pumps 25 to the second stage variable depth reactor 26. In the second stage reactor 26, 90%-plus of the remaining soluble organic material will be biologically reduced to simpler forms and converted to carbon dioxide, water and cell mass. The mixed liquor accomplishing this task is pumped at a constant rate from the second stage reactor 26 to the second stage clarifier 28 by way of the second stage reactor air lift pumps 27.

Effluent from the second stage clarifier 28 is discharged by displacement into the receiving stream 19. RAS form the second stage clarifier 28 is returned to the second stage activator 24 by way of the second stage RAS return loop line 29. Surplus biomass is removed from the RAS loop 29 by way of the second stage WAS conveyance line 30 into a common WAS pump tank 22 from where it is pumped into a common sludge holding tank 16 by way of the WAS transfer pump 23.

The first and second stage WAS is digested in a common tank 16, water liberated by the digestion process is decanted back to the first stage activator 2 by way of the decant return line 7. Digested sludge is periodically pumped form the sludge holding tank 16 to a dewatering system 16 (not shown) by way of a digested sludge transfer pump 20.

Figure 5:
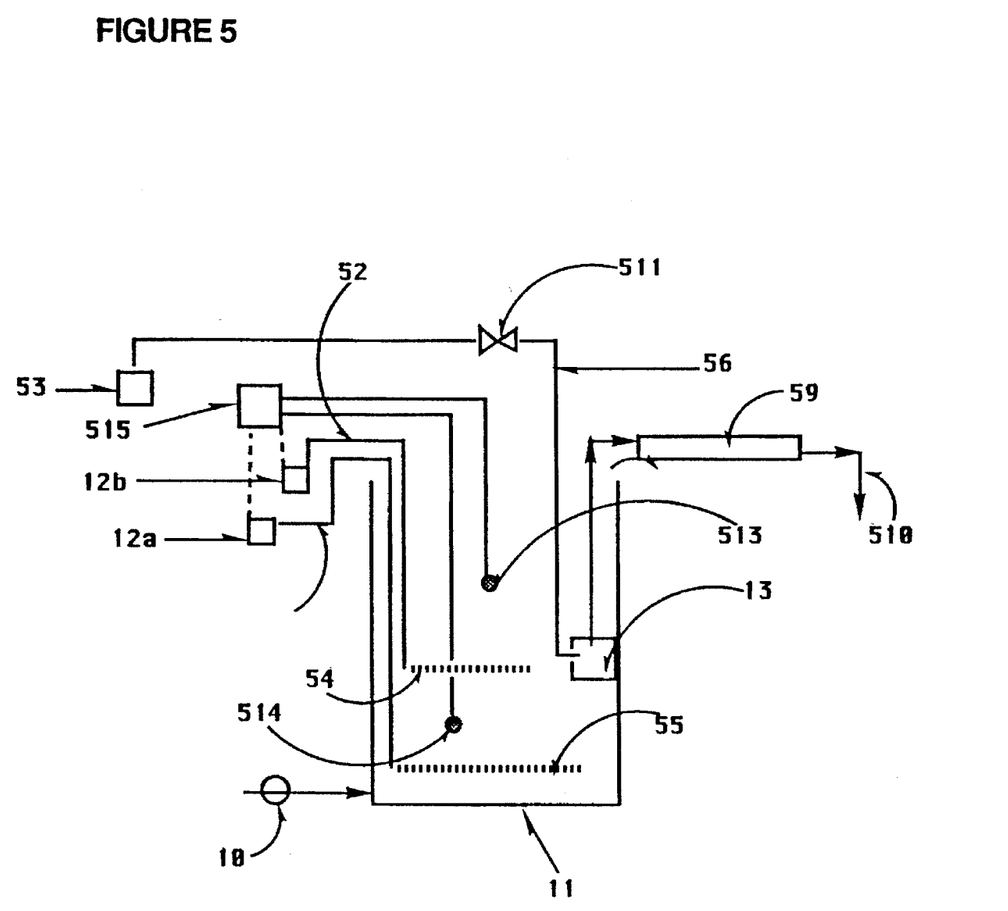
FIG. 5 is a general representation depicting a general cross view of a variable depth reactor according to the present invention.
Figure 6:
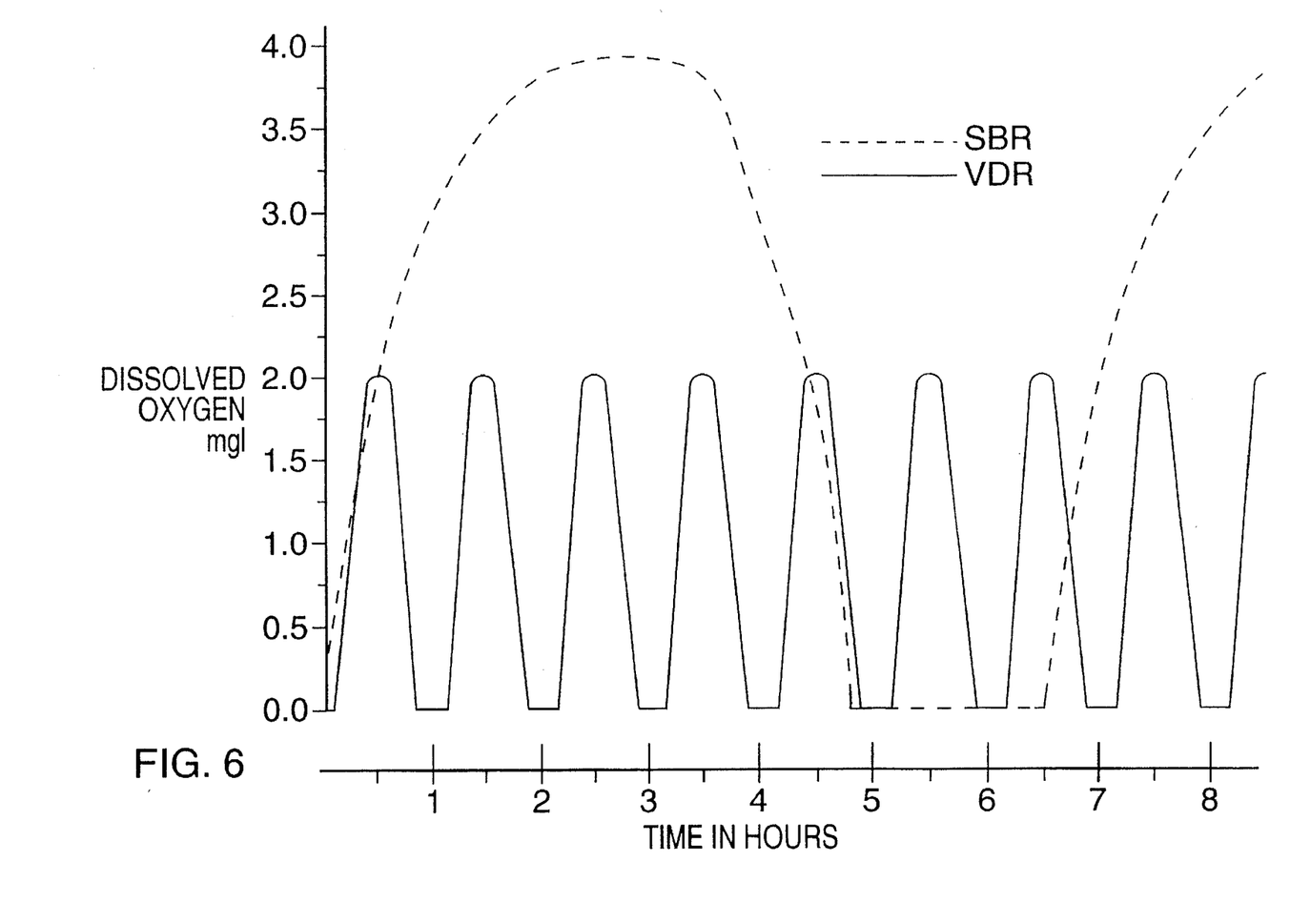
FIG. 6 illustrates the oxygen transfer efficiency of a variable depth reactor according to the present invention and SBR's of the prior art; more specifically it shows the large swings of dissolved oxygen within the wastewater undergoing using conventional SBR process techniques as compared to the more efficient swings of dissolved oxygen in the multiple cycles of the variable depth reactor process according to the present invention.

With regard to FIG. 5, there is shown a cross sectional elevation view of a typical variable depth reactor 11 according to the present invention having a two-tier aeration system, air lift transfer pump, two dissolved oxygen (D. 0.) probes, and an air dissipation tank. The variable depth reactor shown in FIG. 5 is taken from a 24 feet tall reactor designed for a specified purpose; the actual height of the reactor, however, may fall within a wide range of both height and width depending upon the needs of the specific wastestream to be treated according to the present invention. More specifically, process air is supplied to the reactor in two separate air lines 51 and 52 and driven by external blower 12a and 12b, respectively. Process air line 51 supplies air to the lower tier of the variable depth reactor 11 through an air diffuser 55, preferably diffuser 55 is a coarse-type bubbler, from which the air is pumped into the lower level of the reactor liquor as a series of small bubbles. Process air line 52 supplies air to the upper tier of the variable depth reactor 11 through an air diffuser 54, preferably diffuser 54 is a coarse-type bubbler from which the air is pumped into the upper level of the reactor liquor as a series of small bubbles. Utility blower 53 supplies air to the reactor air lift transfer pump 13 by way of the air lift air supply line 56. Air flow to this pump is controlled by the air lift pump control valve 511; control of the utility air at this point controls the transfer rate of the air lift pump 13 into the anti-siphon discharge pipe 58. The mixed liquor is pumped from the variable depth reactor 11 by the air lift pump 13 to the air dissipation tank 59 where any air entrained by the transfer pump will be dissipated from the transferred mixed liquor prior to being gravity discharged into the clarifier 14 through the conveyance pipe 510.

The operation of the process blowers 51 and 52 is preferably controlled by a microprocessor 515. Input to the microprocessor 515 comes form a mid-depth D.O. probe 513 which determines when the aerated mixed liquor in the reactor attains a D.O. of 2.0 mg/l at which time the processor is set to terminate the blower operation, thus ending the oxic cycle, and from a sludge blanket D.O. probe 514 located just above diffuser 55 which determines when the D.O. has been eroded to 0.0 and initiates the blower, thus terminating the anoxic cycle.

In the treatment process according to the present invention, incoming wastewater is introduced into an activator tank 2 where it is intimately mixed with the RAS from the clarifier 14 and with the decant from the sludge holding tank 16. In addition, backwash water from the systems polishing filters 17 if used, may also be introduced into the activator 2. In the activator 2, the primary mixture of wastewater influent and RAS are mixed, either by mechanical means or by the use of diffused aeration; if mixing is done mechanically, the activator may then be operated in an anoxic mode to aid in the uptake of nitrogen and phosphorus. The mechanical approach also allows for the predatory nature of the biomass substrate to eliminate filamentous bacteria that is responsible for a majority of undesirable sludge bulking. When aeration mixing is used, it aids in the stripping of some light volatile hydrocarbons and dissolved gasses often present in some industrial wastewaters. Thus, the selection between mechanical and aeration depends somewhat upon what wastes are present in the wastewater to be treated and to what degree such treatment is to extend.

As the wastewater is stored and mixed in activator 2, the pH is constantly monitored and adjusted to remain within a desired pH range of about 7.0 to 8.0, preferably 7.5 to 8.0. This accomplishes two functions: first, it protects the downstream biological treatment systems from an industrial wastewater with a non-compliant and possibly toxic pH; and secondly, it restores the alkalinity consumed (a natural process that takes place as the biological reduction of organic material produces carbon dioxide which when dissolved in water produces a mild acid) by the biological respiration process taking place in the variable depth reactor according to the present invention.

Activator 2 also serves as an entry point for other waste streams exiting from downstream wastewater treatment process units. For example, decant line 7 from the sludge holding tank 16, filtrate line 8 from the dewatering unit 21, and backwash water line 9 from the filter 17 carry decant, filtrate and backwash, respectively, to the activator 2 so that these streams may recycle through the system and thus undergo additional treatment.

In addition to the above secondary purposes, the activator's primary objective is to activate the biomass. This is accomplished by taking the settled biomass from the bottom of the clarifier 14, and returning it to the activator 2 to be mixed with the incoming wastewater. The RAS represents the concentrated MLSS previously dispersed in the variable depth reactor 11. While dispersed in the variable depth reactor, the biomass has the opportunity to absorb the soluble organic material present in the wastewater and begin the conversion of this material into cell mass, carbon dioxide and water. This conversion takes place beginning with cyclic oxic/anoxide modes within the variable depth reactor, and in the anoxic mode in the bottom of the clarifier 14. The complete assimilation of the absorbed organic is accomplished by the time the RAS is returned to the activator. In the activator, this RAS absorbs the nutrients present in the incoming wastewater, and within a fairly short period of time (approximately 10 minutes) the active biomass will have absorbed 90% of the available soluble organic in a properly sized activator.

Rapid absorption by the RAS is accomplished due to the aggressive nature of the RAS, the relatively high concentration of active biomass present in the activator, and the nutrient rich characteristics of the incoming wastewater. The RAS is aggressive because it has been allowed to digest and assimilate organic material from the previous pass through the variable depth reactor, and now finds itself starved for organic nutrients. The activator 2 maintains a relatively high concentration of active biomass due to the fact that 100% of the MLSS is returned to the activator 2 in the form of RAS at a flow rate representing 0.25 of the average daily flow (ADF). Using this figure, the relative concentrate of active biomass in the activator 2 could be as high as four times that in the variable depth reactor.

Using the variable depth reactor process according to the present invention, the activator 2 accomplished this mixing, nutrient addition and pH control in a reactor that has a 10 minute detention time under peak flow conditions defined as 3Q ADF (wherein Q is equal to the ADF/1440) plus 1Q RAS plus 100% sludge holding tank decant in 120 minutes plus one filter cell's (if used) 10 minute backwash flow. Consequently, with these parameters, wastewater would have a 30 to 45 minute retention time in the activator under normal operating conditions. Activator 2 will be designed to accommodate the internal plant hydraulic flows while developing a homogenous mixture to feed the downstream variable depth reactor, equalization of the incoming wastewater flow would be accomplished in the variable depth reactor.

The variable depth reactor as depicted in FIG. 2, is designed to be a single stage continuous flow sequential treatment reactor combining the functions of flow equalization with biological reduction of organic materials; in short, it is designed to be based upon an activated sludge process for the treatment of wastewater.

The activated wastewater is pumped from the activator 2 into the variable depth reactor of the present invention at a rate equal to the incoming hydraulic flow through inlet pipe 1 at a rate consistent with its generation. This flow is coupled with other internal process flows (RAS, SHT decant, filter backwash, etc.) and pumped into the variable depth reactor by one or more transfer pumps sized by good engineering practices to handle the hydraulic peaks anticipated for the system. Flow exits the variable depth reactor by way of an air-operated variable lift pump at a preferable rate equal to the ADF equalized over a 24 hour period adding a specific RAS flow. In actual use, this rate (Q) would be determined by taking the total daily flow and dividing it by 1440 to determine the average gpm to undergo treatment. This figure would then be added to the RAS rate in gpm which represents a percentage of the ADF. For example, utilizing a typical treatment system, a 200,000 gallon per day system with a 0.25% RAS rate would be set to transfer 174 gpm from the variable depth reactor. The formula would be expressed as $$t[ADF \times \%F/t)-(ADF/1440)]$$

The difference between the instantaneous pump transfer rate from the activator 2 and the exit transfer pump rate from the variable depth reactor is adsorbed by the volume of the variable depth reactor dedicated to equalization. This absorption takes place by allowing the depth in the reactor to vary (and thus the term, variable depth reactor) between an upper equalization capacity and a lower operating level. For example, if a 200,000 gallon per day industrial process generates 90% of its flow during a 2 shift operation, then 47,040 gallons would have to be dedicated for equalization in order to allow the variable depth reactor to constantly and consistently load the downstream clarifier.

Thus, an advantage of the variable depth reactor according to the present invention is that it allows for daily, weekly and monthly process flow rate variations internal to a single stage reactor without the use of a separate equalization tank or operator management of flow between parallel trains or sequences within specific batches. The present invention also allows for the utilization of the portion of the reactor dedicated to equalization as additional bioreactor volume; an approach that effectively reduces the overall organic load per unit volume by increasing the available volume of the reactor.

The present invention further handles the problems associated with SBRs and other activated sludge systems as they relate to the process control loop, specifically the oxygenation aspect of the oxic/anoxic cycles. As stated above, attempts described in earlier U.S. patents to control the dissolved oxygen in the bioreactor by using a D.O. probe and programmable timer failed in regard to blower optimization and the preclusion of over-aeration; other approaches used a D.O. probe to simply initiate oxygenation with an automatic timer used to terminate oxygenation. While these attempts establish a more scientific method by which the trigger point is attained, it in no way controls the termination point with the same degree of accuracy as found in the present invention. Consequently, prior systems are prone to over-shooting the oxic/anoxic cycle times.

The process for using the variable depth reactor apparatus of the present invention proposes the use of a D.O. monitoring system to terminate the cycles based on the attainment of a goal which, for preferred conditions, may be a goal of 2.0 mg/l D.O. (an established industry standard) in the oxic cycle, and 0.0 mg/l D.O. in the anoxic cycle. The orientation of the control loop around a termination point insures that sufficient oxygen has been supplied or depleted to satisfy the particular mode of operation. This approach according to the present invention prevents the system from over-aerating once the target is attained, and also prevents biomass mortality if it is held for an extended period of time at 0.0 mg/l D.O. levels. This design optimizes the use of the aeration blowers in that they are engaged only for the period of time required to attain oxygenation. Once this point is reached, the blowers are shut down until the D.O. level is completely eroded by the respiration of the biomass. Thus, the present invention provides for an aeration system that immediately responds to the oxygen demand of the biomass; it is not linked to a five day BOD test or a preset blower run timers, but is related directly to the oxygen uptake rate of the active biomass within the variable depth reactor.

As shown in FIG. 5, the variable depth reactor of the present invention incorporates the use of two D.O. probe/controllers: one is set at a mid-depth point to determine when the mixed liquor under aeration reaches a 2.0 mg/l D.O. level (or any other level that is optimized for the specific wastewater undergoing treatment within the system). A second D.O. probe is suspended near the bottom (at a point about 5–25%, preferably 5–10%, of the reactor's height) of the reactor and is so-placed to be able to measure the D.O. uptake in the sludge blanket during the anoxic mode. Measurement at this point affords the control system the most accurate assessment of the respiration rate of the biomass as it settles to the bottom of the unaerated reactor. This design shortens the cycle time from more traditional anoxic/oxic cycle reactors, and also reduces the total blower run time as it provides only enough air to meet the exact oxygen demand of the biomass.

In addition, the present invention further optimizes blower operation by the use of a two-tier diffused air system for aeration. The upper tier is installed at mid-depth in the variable depth reactor and provides the bulk of the air required by the oxic cycle; the lower tier is installed below the lower D.O. probe and is utilized to completely mix the fluid within the reactor thereby integrating the lower anoxic strata into the oxic zones at the initiation of that cycle. This approach allows an aerobic cap to be placed over the anoxic zone when a greater degree of nutrient removal is required The variable depth reactor process according to the present invention can be designed to run with the oxic/anoxic modes operating simultaneously, with an aerobic cap over the anoxic layer. The depth of the reactor and the placement of the upper tier of diffusers allows this to take place. In the lower strata of the mixed liquor within the reactor, the anoxic reaction will taking place and the facultative biomass will absorb the soluble organic material present in the wastewater and bio-emulsify the insoluble organic material. As it accomplishes this function, the soluble organic material will be assimilated by the facultative biomass to the limits of their respiration, surplus organic material, as well as by-products from anoxic degradation of organics will migrate into the upper, aerobic, layer. Here these soluble organics will be broken down aerobically and converted to carbon dioxide, water, nitric oxides, etc. The aerobic cap prevents the soluble organic from passing through the anoxic layer and exiting the system without additional treatment. It also accomplishes a similar function for the anoxic cycle's by-products. Lastly, the aerobic cap prevents the more obtrusive by-products, e.g., hydrogen sulfide, methane, etc., from exiting the anoxic strata directly to the atmosphere where it may create local odor, corrosion, and explosive problems.

Assuming a typical system, the incoming mixed wastewater from the activator 2 would be discharged into the bottom strata of the bioreactor 11. Here it would be mixed by displacement and hydraulic action with the sludge blanket present in the bottom portion, that is approximately the portion within 10%–20% from the floor of the bioreactor. This zone is quiescent, and is affected little by the aggressively aerated upper oxic zone. Tests of such an aeration system using coarse bubble diffusers indicated that the sphere and influence created by the diffuser scours the reactor bottom about two feet below the diffuser, but will not keep MLSS in suspension four feet below the diffuser bottom. That is, in a twenty-four foot deep variable depth reactor with a top aeration tier installed eight feet off the bottom, a three to four foot anoxic sludge blanket would be created at the bottom of the reactor. The incoming wastewater would pass through the layer allowing anoxic treatment to take place; as this wastewater is displaced by subsequent flow, it will migrate upward into the oxic zone for additional treatment.

Periodically, the bottom tier of diffusers would be energized based on total erosion of D.O., and this would mix the bottom sludge contact blanket in with the MLSS in the oxic zone. Upon termination of the aeration cycle, a new sludge contact blanket would form in the bottom portion of the variable depth reactor. Integration of the anoxic D.O. probe with the blower providing air to the bottom tier would be coupled with a similar integration of the oxic D.O. probe with the blower providing air to the upper tier. In this fashion, the D.O. control loop described above could operate the two tier diffuser system with the anoxic sludge blanket reactor, thereby enhancing nutrient removal.

The following example is provided a process description of a working example of a single stage pretreatment process according to the present invention:

EXAMPLE I

The following example is designed for an 80,000 gallon per day wastewater discharge having a 3,000 mg/l BOD being discharged from a processing plant, by gravity, into the activator tank 2 of the variable depth reactor system according to the present invention. Within the activator, the incoming wastewater would be mixed with the return activated sludge (RAS) from the secondary clarifies insuring that the active biomass is intimately dispersed with the incoming food source. Decant from the adjacent sludge holding tank would also be periodically introduced into the activator tank for mixing and further treatment. The contents of the activator tank would be kept mixed by way of diffused air distributed along the sides of the tank. The system would preferably be set up so that air could be applied at a rate of at least 30 CFM/1,000 ft$^3$ of tank volume. In the event that an anoxic mix mode is selected, then the submerged pumps would be set to accomplish mixing without oxygenation, but initially the system would be set up in the aerobic mode. The completely mixed wastewater would be pumped by way of two submersible pumps into the variable depth reactor.

For purposes of this example, the activator tank is designed to hold approximately 3,360 gallons of mixed wastewater which will account for 12 minutes of retention time, based on a maximum flow of 168 gpm (3Q peak) from the processing facility, 56 gpm (1Q RAS) returned from the clarifiers, and 60 gpm decant flow from the sludge holding tank. This time is sufficient to totally mix the flows and hold them long enough to buffer any organic surges from the processing plant. The activator tank also establishes the first line of defense for protection against accidental dumps of non-compliant wastes, detergents, acids, caustics, cleaners, etc. that might accidentally be discharged with the wastewater. This type of waste could then be isolated in the activator tank and neutralized or pumped out before it is allowed to have a detrimental effect on the downstream process.

The variable depth reactor process of the present invention operates on a unique variation of the activated sludge process. It combines the functions of the equalization tank with that of secondary aeration. It accomplishes the first task by allowing the depth within (for purposes of this example) the 48' diameter reactor to vary from 22' SWD to 19' SWD accounting for approximately 40,000 gallons of tank capacity. This varying depth absorbs the hydraulic surges produced by intermittent process discharges coming from the processing plant. The treated wastewater would exit the reactor by way of a set of airlift equalization pumps, at a constant rate of approximately 85 gpm, thereby consistently loading the downstream clarifier. The variable depth reactor system according to the present invention accomplishes equalization while utilizing a portion of the bio-reactor 11, so that biological reduction also takes place during the equalization process.

The second function of the reactor is to accomplish biological reduction of the organics present in the waste stream. This is done with the use of the activated sludge process where floc-forming bacterial agglomerate to form a biomass that absorbs and assimilates the soluble organics present in the waste stream, converting them to carbon dioxide, water and cell mass. The biomass reduces complex organics to simple forms by way of biological oxidation. In order to facilitate the process, the reactor system according to the present invention keeps the biomass mixed and in contact with incoming food and provides enough oxygen to support the respiration process. Oxygen and mixing for this aspect of the process are provided by a wide band coarse bubble air diffusion system designed to provide 4,368 pounds of oxygen per day standard oxygen requirement, based upon an actual oxygen requirement of 2,402 pounds of oxygen per day (alpha of 0.75, beta of 0.95, and theta of 1.024). This supply is based on a delivery of compressed air at a diffuser water depth of 18' which ensures that adequate oxygen will be transferred at the low water depth of 19'. The system also provides mixing energy in the form of diffused air at a rate of at lease 20 CFM/1,000 ft$^3$ of tank volume.

The aeration rate within the bioreactor is controlled by bringing compressed air blowers on and off line. The number of blowers and length of operation of each blower is controlled by the PLC in the main control panel. The operational sequence is determined by the respiratory rate of the biomass. A dissolved oxygen probe mounted in the bioreactor, approximately 2' off the floor, monitors the D.O. levels during aeration periods. Based on this information, the PLC will curtail the operation of blowers when dissolved oxygen levels within the reactor reach 2.0 mg/l, or when a predetermined aeration cycle ends. The D.O. probe will then monitor the consumption of oxygen by the biomass; its placement in the sludge blanket—approximately at the midpoint of the bioreactor—will afford it the most accurate measurement of biomass oxygen uptake. Upon depletion of the oxygen levels in the sludge blanket as indicated by the probe, the PLC will initiate a reoxygenation cycle and bring the appropriate number of blowers on line. A fail-safe program with site-specific sequential information, may also be installed in the PLC, whereby the blower cycles automatically initiate if a default occurs with the D.O. monitoring system.

A flow of 80,000 gpd of 3,000 mg/ml BOD wastewater through the reactor yields 2,002 pounds of BOD per day. In a pretreatment mode, the variable depth reactor would be loaded at a rate of 60 #s BOD/day/1000 ft$^3$ of reactor volume. This means that the reactor would require a hydraulic capacity of at least 250,000 gallons which would be added to the 40,000 gallons already dedicated for equalization, thereby requiring the reactor to have a capacity of 290,000 gallons. Engineering practices would suggest a proposed VDR for this system, when operating at the maximum water level of 22', to hold 292,000 gallons.

The readily setteable biomass developed in the reactor is pumped by way of a variable capacity air lift pump to an adjacent clarifier. Here liquid/solid separation takes place and the biomass settles to the bottom of the clarifier and is removed as return activated sludge (RAS) by pumps. The RAS is pumped back into the activator tank where it is reintroduced to the incoming wastewater. Surplus biomass generated from the conversion of soluble organics into cell mass is periodically removed from the system as waste activated sludge (WAS). The top phase of liquid in the clarifiers is relatively clear and is discharged by displacement over an effluent weir and exits the clarifier by gravity to the sanitary sewer. The clarifier may also be provided with a surface skimmer that will return any floatables to the activator tank of further processing. The clarifier is sized to provide at least four hours retention time at ADF. The proposed clarifier for this system has a total volume of 15,100 gallons yielding a retention time of 4.5 hours. The clarifiers are also sized so that they do not have a surface loading rate in excess of 600 gpd/ft$^3$. The clarifier for the system in this example has approximately 280 ft$^3$ of effective surface area, which means it is loaded at a rate of 285 gpd/ft$^3$, below the design maximum. The weir overflow rate of 6,667 gpd/ft is below the 10,000 gpd design parameter.

The WAS is pumped, by way of the RAS system, out of the clarifier and diverted to a sludge holding tank where a portion of the RAS is deposited each day as WAS. This procedure is used in order to maintain the optimum level of mixed liquor suspended solids (MLSS) in the bio-reactor. When the MLSS is above the optimum level, it has a tendency to cause suspended solids to escape over the effluent weir and when it is below the targeted level there is often not enough biomass present to accomplish adequate treatment. Proper MLSS levels are accomplished by removing the surplus biomass out of the system; this removed biomass is deposited in a sludge holding tank where it is aerated in the absence of additional nutrients. The WAS then moves into an endogenous respiration phase and draws upon its own cell mass as a nutrient source. As the WAS begins to self-digest, it liberates carbon dioxide and waster which allows for the periodic decanting of the surplus water back into the activator tank. When the bio-reactor is loaded at a rate of 2,002 lbss BOD/day, it will convert this at a rate of 0.4 lbs of suspended solid per pound of BOD removed, meaning that the SHT will see 801 lbs per day dry weight of suspended solids or equivalent to 9,600 gpd of 1% solid sludge. The decanting process will thicken the sludge to 2%, thereby yielding a 50% reduction in volume. The digestion process also accounts for an additional reduction in volume by 50% indicating that the net discharge to the sludge holding tank would be 2,400 gpd. In order to increase digestion capacity and afford the operator with a degree of latitude, the holding tank is sized to accommodate at least 30 days of sludge holding capacity, or approximately 72,000 gallons of sludge.

The following examples provide data for two prototype variable depth reactor systems for the treatment of wastewater according to the present invention.

EXAMPLE II

A combination dissolved air flotation (DAF) variable depth reactor was provided for a butter creamery for a 100,000 gpd wastewater flow. The wastewater primarily generated by process area clean up and equipment washing flowed by gravity into a dedicated sump pit and from here it was pumped into a 150,000 gallon equalization tank. The equalized wastewater was then pumped to a DAF at a rate of 100 gpm; the flow at this point was chemically conditioned to enhance FOG removal in the DAF. The DAF removed approximately 90% of the FOG and 70% of the TSS (primarily milk solids). The removal of the biodegradable material resulted in an overall reduction in BOD from 1,800 to 400 mg/l. The DAF effluent was then pH adjusted to 7.5 and pumped into a 150,000 gallon variable depth reactor designed to accommodate 25,000 gallons of EQ volume and 125,000 gallons of biological reduction capacity. The reactor, by way of its transfer pumps, then downloaded adjacent clarifies at a rate of 105 gpm. Effluent from these clarifiers is discharged into a receiving stream with an effluent BOD concentration of less than 10 mg/l. Settled sludge from the clarifier bottom was transferred by lift pumps to a RAS pump tank adjacent to the clarifiers and then returned to the influent end of the reactor.

This system was not equipped with an activator tank, the RAS was simply introduced into the reactor at a location adjacent to the discharge point of the incoming wastewater from the DAF. WAS was removed from the RAS loop by diverting the RAS to an adjacent equalization tank. THe WAS could then be removed by the DAF and disposed of with the FOG float coming off of the DAF. It was noted during operation that the introduction of the WAS into the equalization tank increased the BOD removal across that tank. The introduction of this WAS as a source of an active biomass, into the equalization tank caused the assimilation of 40% of the available BOD by the biomass. It was also noted during initial studies that the biomass activity was retarded by the substantial amount of FOG present in the equalization tank and by pH swings ranging from 4.0 to 11.0 due to the use of sodium hydroxide as a cleaner. Despite these detrimental factors, the biomass introduced as WAS was still able to accomplish some degree of biological reduction of organic material. This observation led to the development of the activator tank concept according to the system present invention.

EXAMPLE III

Extensive pilot testing has been done on a wastewater stream generated by an egg-breaking plant. The wastewater from this stream consisted mostly of wash-down water from the cleaning of the plant; it consisted of 60,000 gpd of wastewater with a BOD content of 4,000 mg/l which was primarily made up of the whites and yolks of eggs combined with sanitizing agents and wash water. The required goal was to reduce the BOD from 4,000 mg/l to less than 30 mg/l so that it would be safe to be discharged under governmental regulations into a receiving stream.

Initial tests concluded that the variable depth reactor approach could attain the desired results if the process were operated as a 2-stage system comparable to that seen in FIG. 4. This meant that the first stage reactor would see an incoming load of 4,000 mg/l and reduce it by 90% to 400 mg/l, and a second stage reactor would further reduce this from 400 to 30 mg/l. Pilot studies also indicated that the first stage reactor could be loaded at rates in excess of 80 # BOD/kft$^3$ and the second stage loaded at 20 # BOD/kft$^3$. The total wastewater treatment system was set up with a pH control loop in both the first and second stage activators.

Using these parameters, a process was developed to treat 60,000 gpd of wastewater. After a 6 week acclimation period, the system was discharging an effluent from the second stage clarifier at levels less than 30 mg/l BOD/TSS. The first stage reactor is in operation approximately 40% of the time in the anoxic mode and generating sludge at a rate of 0.3 # WAS/lb BOD removed. The second stage reactor is operating approximately 50% of the time in the anoxic mode and generating sludge at a rate of less than 0.2 # WAS/lb BOD removed.

The variable depth reactor processing system for the treatment of wastewaters according to the present invention has a significant advantage over the conventional activated sludge processes currently in use.

The standard conventional activated sludge (CAS) system relies upon the use of a strictly aerobic bio-reactor followed by a conventional gravity clarifier for liquid/solid separation. The activated sludge design fosters the development of an exclusively aerobic biomass in the reactor which biologically oxidizes the organic material present in the wastewater and converts it into carbon dioxide, water and cell mass, at a rate that is a function of mean cell residence time. As a result, older sludges will convert the soluble organics at lower rates per pound of BOD reduced than younger sludges respirating in the log growth phase. These younger sludges do more work per pound of biomass than the older sludges, but generate substantially more cell mass.

The vast amount of sludge generated by the CAS system operating in the log growth phase has been one of the major criticisms of this design. The second criticism of the CAS system related to the excessive amount of electric power the system consumes. The CAS system requires that the main bioreactor be kept continually aerobic with a D.O. level of 2.0 mg/l, in order to accomplish this level, blowers must run continuously. The power provides the process energy for the conversion of starches and sugars to carbon dioxide and water, and the conversion of ammonia to nitric oxides. Since the biomass accomplishing this work is strictly aerobic, this requires readily absorbable oxygen in the form of D.O. Therefore, massive blowers are required to supply compressed air to the bio-reactor in order to supply the respiratory needs of the biomass, as well as to maintain the surplus 2.0 mg/l D.O. This supply of air usually accounts for one of the largest costs associated with the operation of a CAS wastewater treatment plant.

Despite the shortcomings of the CAS system, it remains one of the most widely accepted and used designs in the United States. It was because of these shortcomings that the SBR system was designed. As previously discussed, the SBR design slows the aerobic respiratory process down by periodically operating the reactors in an anoxic mode, thus forcing the development of slightly different, facultative biomass, which has the ability to draw oxygen from nitric oxides and other oxygen-containing compounds present in the wastewater, as by-products of the bio-oxidation process. This approach allows the system to use some oxygen twice, once to produce the nitric oxides, and once as an oxygen source for a separate biomass substrate operating in an anoxic mode. Since this facultative substrate operates in an anoxic mode by drawing chemically bound oxygen from compounds present in the mixed liquor, it requires little energy input during this mode of operation. Also, since the facultative organisms have a lower respiration rate, they generate less surplus cell mass than their totally aerobic counterparts. These characteristics have allowed the SBR to make in-roads into the CAS system's traditional markets.

The SBR design further has the advantage of attaining 2–3 sequences of the oxic/anoxic cycle per day. This exposes the soluble organic material in the wastewater to several of the oxic/anoxic regimes and consequently increases the removal efficiencies of the design.

One principle advantage of the variable depth reactor system according to the present invention is that it sequences the wastewater through multiple oxic/anoxic cycles per day. This approach substantially expands the advantages offered by the SBR and CAS designs. More specifically, the multiple cycle approach of the variable depth reactor according to the present invention has the following advantages:

(a) wastewater can continually enter the variable depth reactor 24 hours per day, the operator need not manage the incoming hydraulic flow as with the SBR while it is in a particular mode of operation (the SBR, since it only goes through 2–3 cycles/day cannot tolerate incoming wastewater during particular cycles and consequently this wastewater must be diverted to an equalization tank or processed through a second SBR; in the variable depth reactor according to the present invention, the incoming wastewater can be introduced continually because it is entering a series of short cycles and consequently if the first cycle is short-circuited, it will have little effect on the treatment since the organic material present in the wastewater will be exposed to an additional series of cycles);

(b) the variable depth reactor according to the present invention accomplishes a greater degree of blower optimization over the SBR and CAS systems, and consequently electric power consumption is less;

(c) the variable depth reactor according to the present invention, because of the utilization of the oxic/anoxic process, fosters the development of a biomass that more effectively removes BOD per pound of MLSS grown than that of the CAS system (a facultative biomass will grow sludge at a ratio of about 0.1 #s WAS/LB BOD removed, and aerobes will grow sludge at a rate of about 0.4 #s WAS/LB BOD removed; since the variable depth reactor process according to the present invention may operate at levels of 50/50 oxic/anoxic, the proportional growth rate is approximately 0.25 which is below what is normally expected for the CAS system. As a result of this oxic/anoxic mix, the process according to the present invention generates less sludge per pound of BOD removed than both the SBR and CAS processes).

Clearly, the variable depth reactor process for the treatment of wastewater is superior to present CAS and SBR system processes.

Thus while I have illustrated and described the preferred embodiment of my invention, it is to be understood that this invention is capable of variation and modification, and I therefore do not wish to be limited to the precise terms set forth, but desire to avail myself of such changes and alterations which may be made for adapting the invention to various usages and conditions. Such variations and modifications, for example, would include the substitution of structurally similar tankage, process parameters, probes, etc. Thus, changes that do not substantially alter the function of the apparatus or process specifically described above are deemed to be within the scope of the present invention. Accordingly, such changes and alterations are properly intended to be within the full range of equivalents, and therefore within the purview of the following claims.

Having thus described my invention and the manner and a process of making and using it in such full, clear, concise and exact terms so as to enable any person skilled in the art to which it pertains, or with which it is most nearly connected, to make and use the same;

I claim:

1. A continuous process for the biological treatment of wastewater which comprises treating wastewater to adjust its pH to a range of from about 7.0 to about 8.5;

discharging said treated wastewater into a biological reactor vessel at a predetermined rate of flow consistent with its generation, said vessel having a fixed height and containing therein at least one dissolved oxygen probe and a two-tier diffused aeration means separated along the height of the reactor wherein a first tier is located at approximately mid-reactor height and provides the majority of the air required for said oxic cycle, and a second tier is located below the dissolved oxygen probe and provides a mixing of fluid within the reactor thereby integrating a lower anoxic strata of said fluid into an upper oxic strata of said fluid at the initiation of that cycle, said means and probe being part of an aeration control loop in which the output from said probe controls an aeration control means that controls an external aerator to provide a flow of air to said means;

biologically reducing within said vessel any organic materials contained in said wastewater by cycling the fluid within said reactor through oxic and anoxic cycles; and removing the biologically reduced wastewater from said reactor at a flow rate generally equal to said predetermined rate of flow.

2. A process according to claim 1 wherein the pH is adjusted to a range of from about 7.5 to about 8.0.

3. A process according to claim 1 wherein the treated wastewater is discharged in an anoxic strata along the bottom of said reactor.

4. A process according to claim 1 which further comprises intimately mixing the treated wastewater with an active biomass in either an anoxic or oxic condition.

5. A process according to claim 1 wherein the removal of biologically reduced wastewater from said vessel is at a flow rate generally equal to the flow rate of treated wastewater being discharged into the reaction vessel.

6. A process according to claim 1 wherein any hydraulic surges in the discharge of wastewater into the reactor vessel are equalized by allowing the depth in the vessel to vary within predetermined levels.

7. A continuous process for the biological treatment of wastewater which comprises treating wastewater to adjust its pH to a range of from about 7.0 to about 8.5;

discharging said treated wastewater into a biological reactor vessel at a predetermined rate of flow consistent with its generation, said vessel having a fixed height and containing therein at least one aeration means and at least two dissolved oxygen probes separated along the height of the reactor and wherein the uppermost probe controls the termination of an oxic cycle within the reactor, and the lowermost probe controls the termination of an anoxic cycle by initiation of aeration within the reactor, said means and probes being part of an aeration control loop in which the output from said probe controls an aeration control means that controls an external aerator to provide a flow of air to said means;

biologically reducing within said vessel any organic materials contained in said wastewater by cycling the fluid within said reactor through oxic and anoxic cycles, and wherein said lower probe terminates the anoxic cycle by initiating aeration within said reactor when the dissolved oxygen within said reactor reaches 0.0 mg/L, and said upper probe terminates aeration within said reactor when the dissolved oxygen within said reactor reaches 2.0 mg/L; and removing the biologically reduced wastewater from said reactor at a flow rate generally equal to said predetermined rate of flow.

8. A process according to claim 7 wherein the lowermost probe is located within the lower 25% of the reactor height, and the uppermost probe is located within the upper 70% of the reactor height.

9. A process according to claim 7 which comprise a two-tier diffused aeration means wherein the upper tier is located at approximately mid-reactor height and provides the majority of the air required for said oxic cycle, and the lower tier is located below the dissolved oxygen probe and provides a mixing of the fluid within the reactor and thereby integrating the lower anoxic strata of said fluid into the oxic zone at the initiation of that cycle.

10. A process according to claim 9 which further comprises providing an aerobic cap of biomass to form at about the level of lowermost probe and thereby separating the reactor into two zones, an upper oxic zone and a lower anoxic zone.

11. A process according to claim 7 wherein the treated wastewater is discharged in an anoxic strata along the bottom of said reactor.

12. A process according to claim 7 which further comprises intimately mixing the treated wastewater with an active biomass in either an anoxic or oxic condition.

13. A process according to claim 7 wherein the removal of biologically reduced wastewater from said vessel is at a flow rate generally equal to the flow rate of treated wastewater being discharged into the reaction vessel.

14. A process according to claim 7 wherein any hydraulic surges in the discharge of wastewater into the reactor vessel are equalized by allowing the depth in the vessel to vary within predetermined levels.

15. A process according to claim 7 wherein the pH is adjusted to a range of from about 7.5 to about 8.0.

16. A continuous process for the biological treatment of wastewater which comprises:

discharging a wastewater influent stream into an activator means;

adjusting the pH of the wastewater within the activator means by the addition of acid and/or caustic to a pH range of from about 7.0 to about 8.5;

discharging the wastewater from the activator means into a biological reactor vessel, said vessel having a two-tier diffused aeration means controlled by a dissolved oxygen probe means to provide oxic and anoxic cycles within said reactor wherein the upper tier is located at approximately mid-reactor height and provides the majority of the air required for said oxic cycle, and the lower tier is located below the dissolved oxygen probe and provides a mixing of the fluid within the reactor and thereby integrating a lower anoxic strata of said fluid into an upper oxic zone at the initiation of the anoxic cycle;

converting soluble organic matter in the wastewater within the vessel to carbon dioxide, water and biomass solids within a mixed liquor, said converting being accomplished by oxic and anoxic microorganisms;

removing the mixed liquor from the reactor to a clarifier means for separation of biomass solids from the mixed liquor;

removing settled biomass solids from said clarifier means and returning said solids as return activated sludge to said activator means; and discharging solid-free effluent from said clarifier for disposal.

17. A process according to claim 16 which further comprises periodically removing settled biomass solids from said clarifier means as waste activated sludge and disposing of said waste activated sludge.

18. A process according to claim 16 which further comprises mixing the wastewater treated to adjust its pH with an active biomass.

19. A process according to claim 16 which further comprises adjusting the nutrient concentration within the wastewater to be treated to optimum parameters for treatment.

* * * * *